United States Patent
Herran et al.

(10) Patent No.: US 9,833,953 B2
(45) Date of Patent: Dec. 5, 2017

(54) METHODS AND DEVICES FOR COUNTERACTING STRESSES DURING 3D PRINTING

(71) Applicant: 3D Systems, Incorporated, Rock Hill, SC (US)

(72) Inventors: Leigh Herran, Charlotte, NC (US); Khalil Moussa, Chapel Hill, NC (US); Martin Alan Johnson, Rock Hill, SC (US); Nickalaus K. Podgursky, Huntersville, NC (US); Chris Roberts Manners, Moorpark, CA (US); Terry Wilkes, Chester, SC (US); Jenny Reilly, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 14/942,444

(22) Filed: Nov. 16, 2015

(65) Prior Publication Data

US 2016/0136903 A1    May 19, 2016

Related U.S. Application Data

(60) Provisional application No. 62/080,007, filed on Nov. 14, 2014.

(51) Int. Cl.
*B29C 67/00* (2017.01)
*B29C 64/40* (2017.01)
(Continued)

(52) U.S. Cl.
CPC .......... *B29C 67/0092* (2013.01); *B29C 64/40* (2017.08); *B29C 67/0055* (2013.01); *B33Y 10/00* (2014.12); *B33Y 40/00* (2014.12)

(58) Field of Classification Search
CPC ...................................................... B29C 64/40
See application file for complete search history.

(56) References Cited

U.S. PATENT DOCUMENTS

| 5,216,616 A | 6/1993 | Masters | |
|---|---|---|---|
| 2006/0186101 A1* | 8/2006 | Hagemeister | A61C 13/0004 219/121.85 |

FOREIGN PATENT DOCUMENTS

| EP | 1270186 | 1/2003 |
|---|---|---|
| EP | 1358855 | 11/2003 |

OTHER PUBLICATIONS

MakerBot: "MakerBot Slicer settings: Anchor", https://mindtouch.makerbot.com; retrieved from the Internet: https://www.makerbot.com/support/new/04_Desktop/Knowledge_Base/Using_Custom_Slicing_Profiles/14-MakerBot_Slicer_settings%3A_Anchor [retrieved on Nov. 18, 2015] (1 page).

(Continued)

*Primary Examiner* — Joshua D Zimmerman

(57) ABSTRACT

Methods of 3D printing an object with reduced curl on at least one surface that contacts a print plate are described herein. For example, in some embodiments, a method of 3D printing an object comprises depositing build material to form a first layer of a 3D printed object and depositing build material in a predetermined pattern to form a first layer of a skirt in contact with the 3D printed object. Depositing build material to form the first layer of the skirt comprises 3D printing a first layer of a sidewalk that substantially surrounds at least a portion of a perimeter of the 3D printed object and 3D printing a first layer of a perforated interface between the sidewalk and the perimeter of the skirt.

18 Claims, 22 Drawing Sheets

(51) Int. Cl.
    *B33Y 10/00*   (2015.01)
    *B33Y 40/00*   (2015.01)

(56) References Cited

OTHER PUBLICATIONS

Reprap Forurns: Cure for the Common Curling: "The Brim ", published Jun. 12, 2012; retrieved from the Internet: http://forums.reprap.org/read.php?1,136147 [retrieved on Nov. 18, 2015 ] (23 pages).

MakerBot Thingiverse: "Ear Raft—Makerware Print Aid" by whpthomas, published Dec. 18, 2012: retrieved from the internet: http://www.thingverse.com/thing:38272 [retrieved on Nov. 18, 2015 ] (3 pages).

Simpilify3D®: "Rafts, Skirts and Brims!": retrieved from the Internet: http://www.simplify3d.com/support/tutorials/rafts-skirts-and-brims/ [retrieved on Nov. 18, 2015] (5 pages).

Blog Spot, "Late Night Noodle. . . , by Kean Nam Yeoh", published on Feb. 23, 2014, retrieved from the Internet: http://knyeoh.blogspot.com/2014/02/what-is-this-3d-slicer-program-part-2.html [retrieved on Nov. 18, 2015] (6 pages).

PCT International Search Report the International Searching Authority for PCT/US2015/060911, dated Mar. 2, 2016 (7 pages).

PCT Written Opinion of the International Searching Authority for PCT/US2015/060911, dated Mar. 2, 2016 (8 pages).

"Brim ou Raft: Quelle difference?", Aug. 20, 2014 (Aug. 20, 2014), XP-002754396, retrieved from the INternet: URL: http://www.references3D.com/brim-ou-raft/ [retrieved on Feb. 17, 2016], pp. 1-4.

PCT International Preliminary Report of Patentability of the International Searching Authority for PCT/US2015/060911, dated May 26, 2017 (9 pages).

* cited by examiner

METHODS AND DEVICES FOR COUNTERACTING STRESSES DURING 3D PRINTING

CROSS REFERENCE TO RELATED APPLICATION

This application claims priority pursuant to 35 U.S.C. §119(e) to U.S. Provisional Patent Application Ser. No. 62/080,007, filed on Nov. 14, 2014, the entirety of which is incorporated herein by reference.

FIELD OF THE INVENTION

The present invention is related to 3D printing and other additive manufacturing processes for creating physical objects, and more particularly, to methods, systems, devices, and designs that prevent warping of physical objects while they are being made by 3D printing or other additive manufacturing processes

BACKGROUND OF THE INVENTION

Digital designs can be made into physical objects by 3D printing, which is also known as additive manufacturing. 3D printing typically comprises depositing or fusing materials in a layer-by-layer manner to create cross-sections of the 3D printed object. Because deposited or fused material may undergo stresses as the material changes temperature, chemical composition, crystal structure, or the like, 3D printed objects can warp during the 3D printing process, and there are prior art techniques for controlling the respective processes to compensate for stresses to eliminate or minimize undesirable warping.

For example, one 3D printing technique commonly referred to as fused deposition modeling can create warping in the first few layers of the 3D printed object based upon the internal stresses causing the initially deposited material to curl up and separate from the print plate upon which the 3D printed object is 3D printed. An example of such curl and separation is shown in the bottom features of the 3D printed object shown in FIG. 1.

Prior art techniques for eliminating or minimizing such curl and separation include printing a raft under the 3D printed object which serves as a transition between the print plate and the 3D printed object. However, such rafts are difficult to remove from the 3D printed object, particularly if the raft and 3D printed object are made from the same build material, and rafts typically leave undesirable defects on the surfaces of the 3D printed object that contacted the raft, and those features must be cut, sanded off, or otherwise removed or hidden.

A further prior art technique is printing anchors at the locations of the 3D printed object most likely to curl or warp based upon the geometry of the 3D printed object. Anchors are typically only one, two, or a few layers thick and increase the surface area of contact between the 3D printed material and the print plate to prevent the 3D printed object from curling and separating from the print plate. FIGS. 2 and 3 show a prior art technique of adding a circular anchor to the corner of a 3D printed object.

One disadvantage of using anchors is they may be difficult to remove and can leave defects on the surface of the 3D printed object from which it is removed.

Yet another prior art technique for preventing curl or warp is the 3D printing of a brim (also known as a skirt) around the entire perimeter of the 3D printed object. A brim is similar to anchors but instead of being positioned only at certain portions of the 3D printed object, the brim simply encircles the entire 3D printed object. Users of the 3D printer can set how wide and thick the brim will be. FIG. 4 shows two 3D printed objects encircled by a brim on the bottom layer(s).

Similar to anchors, brims can be difficult to remove and can leave defects on the surface of the 3D printed object caused by the removal of the brim from the 3D printed object. For example, sometimes knives, box cutters, or other handtools may be required to remove an anchor or brim, which can be dangerous for the user and can leave flaws or other defects on the surface of the 3D printed object.

Therefore a need exists for methods and devices for preventing curl and warping of 3D printed objects without creating difficulty to remove the device from the object and without leaving defects on the 3D printed object.

BRIEF SUMMARY OF THE INVENTION

The various embodiments of the present invention address the above needs and achieve other advantages by providing a 3D printing device that contacts the perimeter of the 3D printed object with a perforated interface to counteract stresses in the 3D printed object that might otherwise cause the 3D printed object to curl or warp. The perforated interface enables the sidewalk to be removed much more easily than prior art 3D printed devices, such as rafts, anchors, and brims, and the perforated interface reduces or eliminates surface defects on the 3D printed object as compared to prior art 3D printed devices for counteracting stresses.

In one aspect, methods of 3D printing an object with reduced curl on at least one surface that contacts a print plate are described herein. For example, in some embodiments, a method described herein comprises depositing build material in a predetermined pattern to form a first layer of a 3D printed object and depositing build material in a predetermined pattern to form a first layer of a 3D printed object. Depositing build material to form the first layer of the skirt comprises 3D printing a first layer of a sidewalk that substantially surrounds at least a portion of a perimeter of the 3D printed object and 3D printing a first layer of a perforated interface between the sidewalk and the perimeter of the skirt.

In some instances, depositing build material to form the first layer of the 3D printed object is carried out prior to depositing build material to form the first layer of the skirt. In some such embodiments, depositing build material to form the first layer of the skirt comprises first, depositing build material to form a perimeter of the sidewalk of the skirt and to subsequently deposit build material to form the perforated interface between the sidewalk and the perimeter of the 3D printed object. Further, in some cases, one or more parameters of the skirt is based upon at least one characteristic or parameter of the 3D printed object. For example, in some cases, at least one of the following parameters of the skirt is determined by at least one of geometry and build material of the 3D printed object: a number of layers of the skirt in addition to the first layer, a width of the sidewalk, a number of contacts that connect the sidewalk to the perimeter of the 3D printed object, a spacing of a plurality of contacts that connect the sidewalk to the perimeter of the 3D printed object, and a shape of a plurality of contacts that connect the sidewalk to the perimeter of the 3D printed object.

Moreover, in some embodiments, the perforated interface defines a plurality of connectors and a plurality of gaps along the perimeter of the 3D printed object. In such embodiments, 3D printing the first layer of the perforated interface between the sidewalk and the perimeter of the skirt can be performed concurrently with 3D printing the first layer of the sidewalk. In some cases, the connectors and gaps define a connector-to-gap ratio, such as a connector-to-gap ratio of less than or equal to 2:1. Further, in some cases, the perforated interface defines a plurality of connectors with sides that define an angle of 90 degrees or less relative to the perimeter of the 3D printed object adjacent the respective connector.

Additionally, in some cases, the sidewalk comprises a sidewalk border that intermittently contacts the perimeter of the 3D printed object to define the perforated interface. In some instances of a method described herein, depositing build material to form the first layer of the sidewalk defines a fill pattern that contacts the perimeter of the 3D printed object to define the perforated interface.

DETAILED DESCRIPTION OF THE INVENTION

Figure 1:
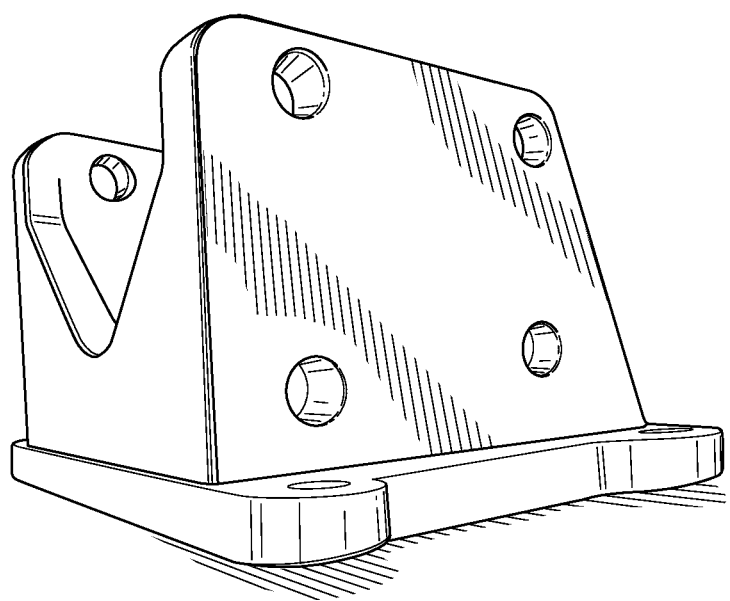
FIG. 1 illustrates a prior art 3D printed object with curled corners.
Figure 2:
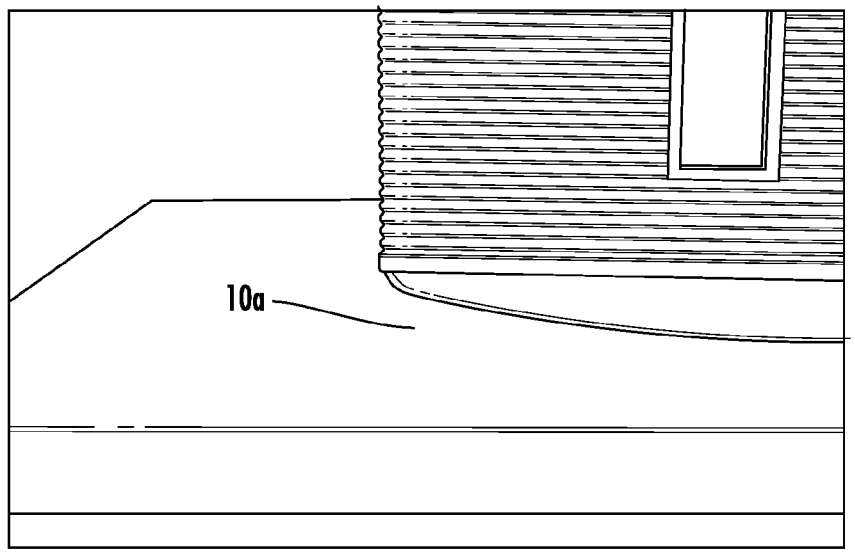
FIG. 2 illustrates a prior art 3D printed object with curled corners.
Figure 3:
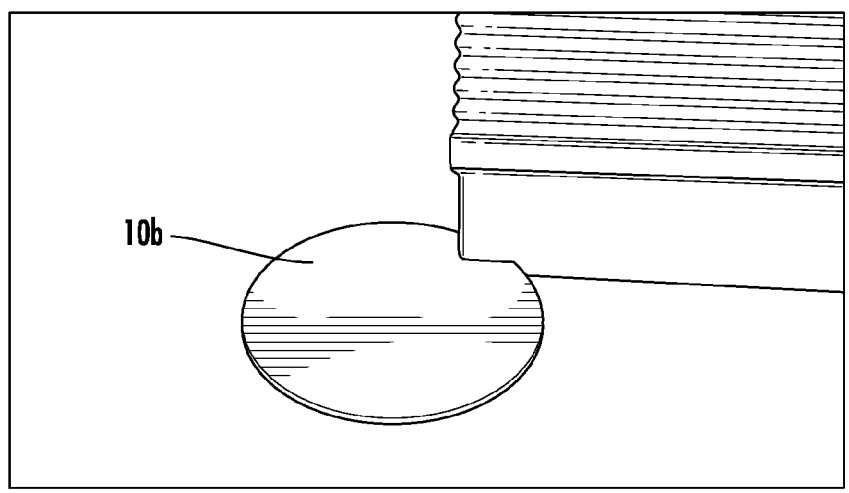
FIG. 3 illustrates a prior art 3D printed object using a previously-existing technique for minimizing corner curl.

The present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing 3D printed objects and 3D printing methods are described and shown in the accompanying drawings with regard to specific types of fused deposition modeling 3D printers, it is envisioned that the functionality of the various apparatus and methods may be applied to any now known or hereafter devised 3D printer or other additive manufacturing system in which it is desired to provide finished 3D printed objects free of curl, warping, surface defects, and other undesirable features. Like numbers refer to like elements throughout.

In one aspect, methods of 3D printing an object with reduced curl on at least one surface that contacts a print plate are described herein. In some instances, a method described herein comprises depositing build material in a predetermined pattern to form a first layer of a 3D printed object and depositing build material in a predetermined pattern to form a first layer of a skirt in contact with the 3D printed object. Depositing build material to form the first layer of the skirt comprises 3D printing a first layer of a sidewalk that substantially surrounds at least a portion of a perimeter of the 3D printed object and 3D printing a first layer of a perforated interface between the sidewalk and the perimeter of the skirt.

For reference purposes herein, certain terms will now be characterized or otherwise defined. "Build material" refers to any material which may be used in an additive manufacturing technique including, but not limited to, fused deposition modeling (FDM) techniques. A build material used for one or more components, such as a portion or all of the 3D printed object, can be the same as or may differ from build material used in another component, as in the case of the skirt. A "skirt" refers to a structure substantially surrounding at least a portion of a perimeter of a 3D printed object and comprising or formed from build material, at least a portion of which is intended or designed to be removed after some or all of the 3D printed object has been formed. In some embodiments described herein, a skirt comprises a sidewalk and a perforated interface. A "sidewalk" is a tab-like portion of the skirt that extends up to and adjoins the perforated interface. The sidewalk is defined by three parameters: Sidewalk Distance ($S_{DIST}$ in FIG. 6A), Sidewalk Layers and Sidewalk Offset ($S_{OFF}$ in FIG. 6A). Sidewalk Distance is the total sidewalk width from the edge of the 3D printed object to the outermost edge of the sidewalk. Sidewalk Layers is the number of layers that the sidewalk is turned on, typically starting with the first layer of the 3D printed object. Sidewalk Offset is the distance between the edge of the 3D printed object and the edge of the Sidewalk and defines the gap at the Sidewalk-Object interface where the perforated interface connects the 3D printed object to the sidewalk. The size of the interface and design of the perforated interface determine the ability of the 3D printed device to counteract the stresses in the 3D printed object and the difficulty of sidewalk removal from the 3D printed object.

Figure 5:
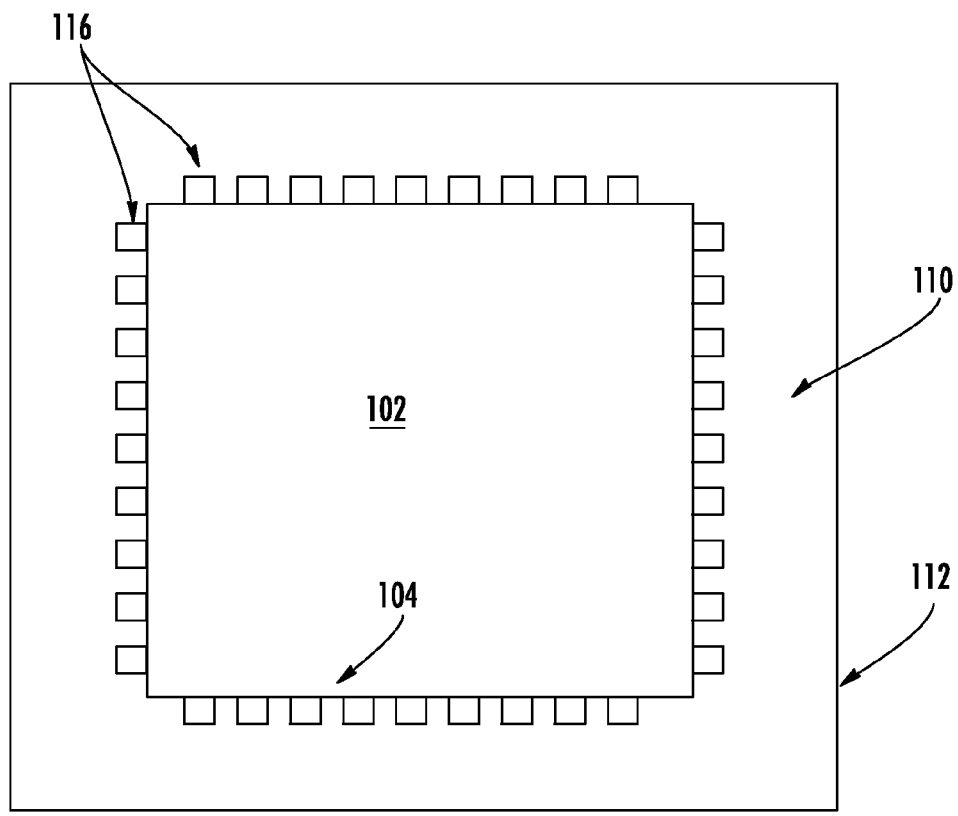
FIG. 5 illustrates a schematic view of a 3D printed object and skirt which may be made according to one embodiment of a method described herein.

FIG. 5 illustrates one or more components consistent with one or more embodiments of methods described herein. In FIG. 5, a 3D printed object (102), also referred to as the part, is shown having a square cross-section and surrounded by a skirt (110). The skirt (110) comprises a sidewalk (112) that substantially surrounds at least a portion of the perimeter of the 3D printed object. The skirt (110) also comprises a perforated interface (116) between the sidewalk (112) and the perimeter of the 3D printed object (102).

Turning now to specific steps of methods described herein, a method of 3D printing an object with reduced curl on at least one surface that contacts a print plate comprises depositing build material in a predetermined pattern to form a first layer of a 3D printed object. Any predetermined pattern can be used in such deposition steps. For example, a particular fill pattern may be selected or deposited in order to interact with a skirt. Further description of embodiments using particular fill patterns will be provided herein below. In some embodiments, depositing build material to form the first layer of the 3D printed object is carried out prior to one or more other method steps described herein. In such embodiments, depositing build material to form the first layer of the 3D printed object can be the first deposition step included in the 3D printing process. For example, in some cases, depositing build material to form the first layer of the 3D printed object is carried out prior to depositing build material to form the first layer of the skirt. In certain other embodiments, depositing build material to form the first layer of the 3D printed object is performed concurrent with or subsequent to one or more other method steps as described further herein below.

Methods described herein further comprise depositing build material in a predetermined pattern to form a first layer of a skirt in contact with the 3D printed object. Consistent with the above discussion of predetermined patterns used in the deposition of the 3D printed object, a predetermined pattern in the skirt can comprise or include any pattern. In some cases, a predetermined pattern provides a particular fill pattern designed or intended to interact with the 3D printed object to provide particular operability. Further discussion of such embodiments will be provided herein below. Dimensions of a skirt formed consistent with methods described herein can be determined and/or deposited based upon one or more parameters of the 3D printed object. For example, in some cases, a width of the sidewalk portion of the skirt can be determined and/or deposited based upon at least one of the geometry and build material of the 3D printed object. Further, a thickness of the skirt, which may be associated with a number of layers of build material applied, can be determined and/or deposited based upon at least one of the geometry and build material of the 3D printed object. For example, in some embodiments, a given build material A may be predisposed to higher degrees of curling than a given build material B. In such embodiments, additional layers of build material may be required in the skirt to reduce curling in the 3D printed object. Thus, where 2 layers of build material in the skirt may be sufficient for build material B, 3 or even 4 layers may be used for build material A. Similarly, where a geometry is more rounded or contains more corners or curves, additional width and/or skirt thickness may be desired.

Depositing build material to form a skirt can be performed prior to, concurrent with, or subsequent to performance of other steps of methods described herein. Further, in some embodiments, one or more components of the skirt may be deposited at a different time than certain other components. For example, in some embodiments, build material is deposited to form the first layer of the 3D printed object, and subsequent to such step, build material is deposited to form the first layer of the skirt. Depositing build material to form the first layer of the skirt, in some such embodiments, comprises first depositing build material to form a perimeter of the sidewalk of the skirt and subsequently depositing build material to form the perforated interface between the sidewalk and the perimeter of the 3D printed object. A perforated interface formed in this manner may be characterized as having a plurality of contacts that connect the sidewalk to the perimeter of the 3D printed object.

Contacts formed according to methods described herein can have one or more parameters that are determined by or tuned according to one or more characteristics of the 3D printed object and/or the build material being used. For example, characteristics that may be determined or tuned based upon geometry and/or build material of the 3D printed object can include at least one of the following: a number of contacts, a spacing of the contacts, and a shape of the contacts. Further description of modification of one or more of these parameters (e.g., number, spacing, and shape of perforated interface features) will be provided herein below. However, it is to be understood that applicable discussion of the appropriateness of modification of certain parameters of connectors may apply to contacts as well as connectors. A perforated interface defined by contacts defines a plurality of contacts and a plurality of gaps disposed between the contacts. As discussed previously, a spacing of the contacts can be tuned as desired or as necessary. Thus, in some embodiments, a contact-to-gap ratio can be provided that is within a desired threshold, such as less than or equal to 2:1, less than or equal to 1:1, less than or equal to 0.5:1, or less than or equal to 0.25:1. Further, a contact-to-gap ratio may be desired that is within a predetermined range, such as between 0.25:1 and 2:1, between 0.5: and 2:1, or between 1:1 and 2:1. Additionally, a contact-to-gap ratio can be between 0.25:1 and 1:1, between 0.25:1 and 0.5:1, or between 0.5:1 and 1:1.

Contacts formed consistent with methods described herein can be deposited by any means not inconsistent with the objectives of the present invention. For example, in some embodiments, contacts are deposited by forming dots, globs, or globules of build material in predetermined locations. Additionally and/or alternatively, a deposition nozzle of a 3D printer can actuate on/off modes rapidly while in motion along the area to be defined as the perforated interface in order to produce an alternating pattern of build material and gaps to form the contacts. Such techniques may be used in combination with, or in place of, methods or techniques in which the contacts are formed of a predetermined shape or in predetermined locations.

In some embodiments of methods described herein, depositing build material to form the sidewalk of the skirt is performed concurrently with depositing build material to form or define the perforated interface. In some such embodiments, depositing build material may be carried out in a manner which forms a plurality of connectors and a plurality of gaps along the perimeter of the 3D printed object. In some such embodiments, one or more parameters of the connectors can be tuned or determined to correspond to the geometry and/or build material of the 3D printed object. For example, in some cases, at least one of the following parameters can be determined or tuned based upon at least one of the geometry and build material of the 3D printed object: a number of connectors, a spacing of the connectors, and a shape of the connectors.

Figure 6A:
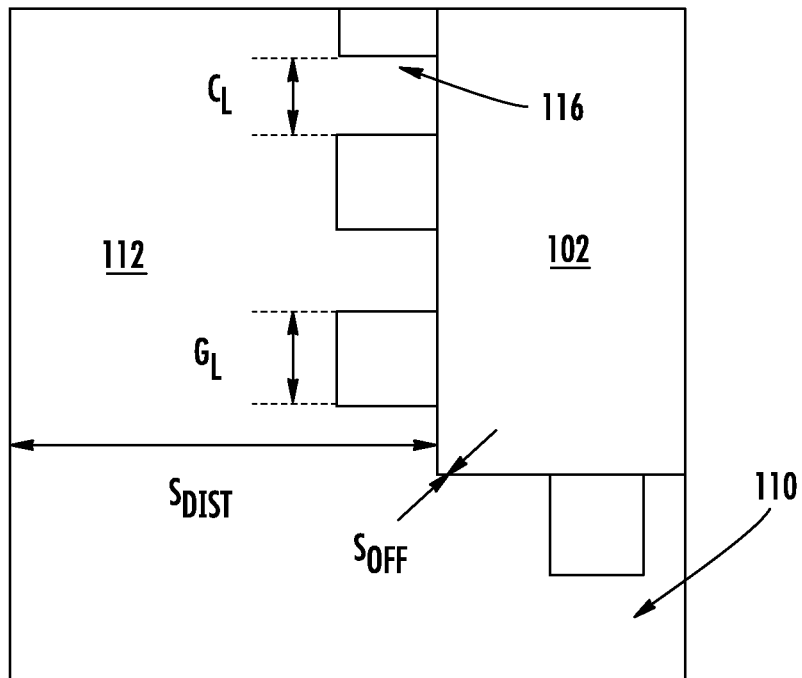
FIG. 6A illustrates a portion a 3D printed object and skirt which may be made according to one embodiment of a method described herein.
Figure 6B:
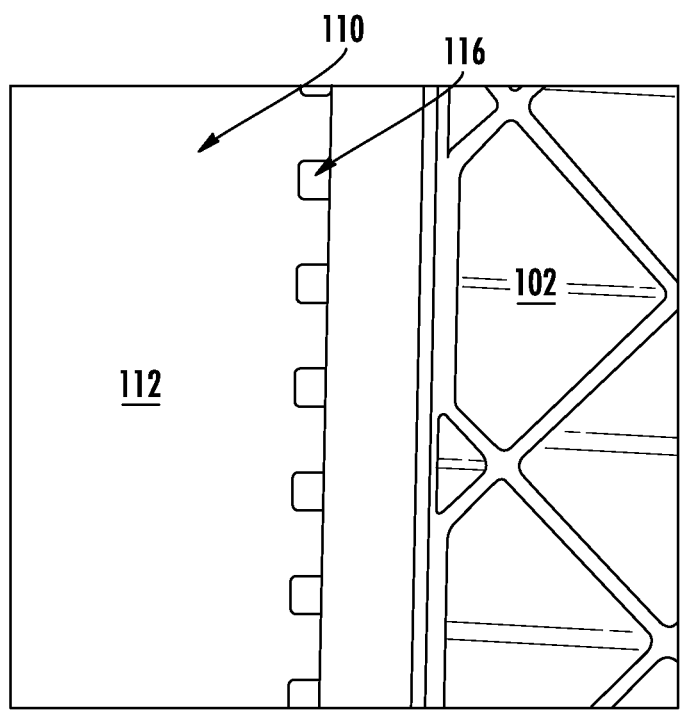
FIG. 6B illustrates a portion of a 3D printed object and skirt which may be made according to one embodiment of a method described herein
Figure 12:
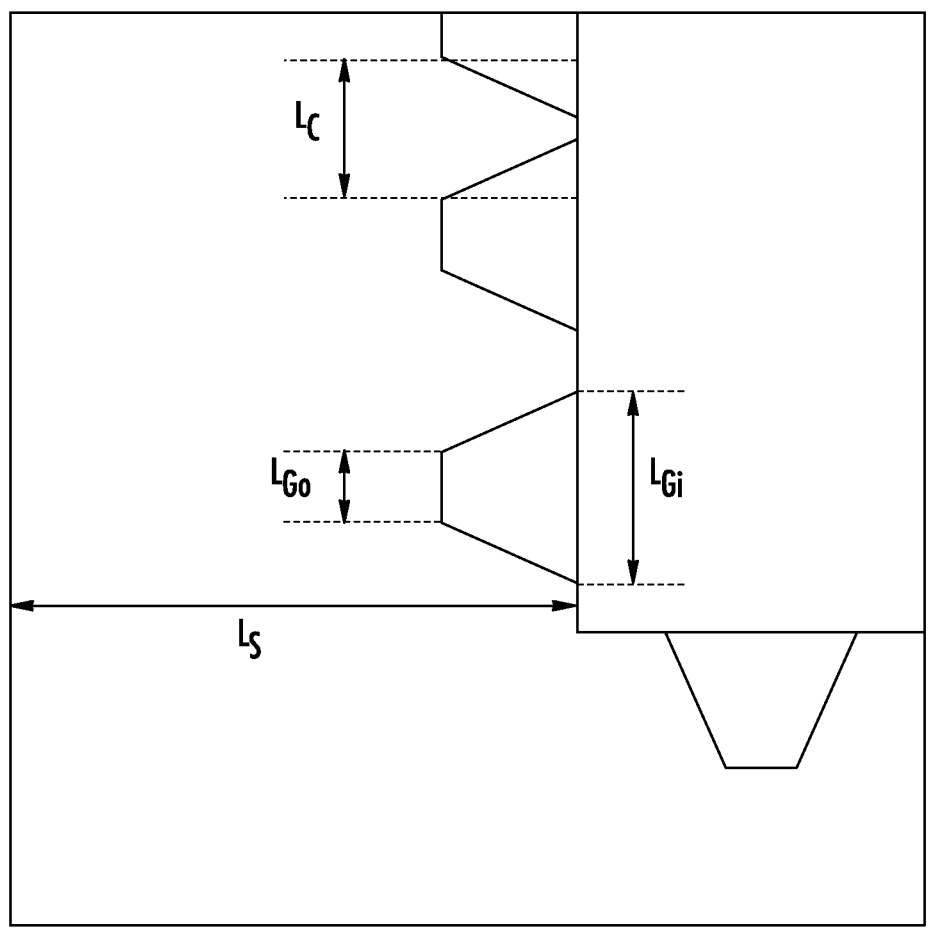
FIG. 12 illustrates a schematic representation of a portion of at least a first layer of a 3D printed object and at least a first layer of a skirt that may be made according to one embodiment of a method described herein.

FIGS. 6A, 6B, and 12 illustrate examples of how some of these parameters (number of connectors and spacing of the connectors) may be modified. For example, FIG. 6A illustrates various dimensional parameters of connectors which may form a perforated interface. $C_L$ represents a connector length which measures the distance between gaps in the perforated interface. $G_L$ represents a gap length which measures the distance between connectors in the perforated interface. Together, these parameters form a connector-to-gap ratio. FIG. 6B illustrates an enlarged view of a perforated interface to illustrate how these dimensions may manifest in practice. As one function of the connector-to-gap ratio ($C_L/G_L$) is to reduce the level of difficulty in sidewalk removal from the 3D printed object, and another function of the connector-to-gap ratio is to improve reduction in corner/contour warping, the connector-to-gap ratio can be optimized depending on the bottom contour cross-sectional area of the 3D printed object and the build material being used.

Thus, in some embodiments of a method described herein, depositing build material to form a perforated interface comprises forming a desired connector-to-gap ratio. In some embodiments, a connector-to-gap ratio is less than or equal to 2:1, such as less than or equal to 1:1, less than or equal to 0.5:1, or less than or equal to 0.25:1. Further, a connector-to-gap ratio can be selected or determined to be within a desired range. For example, in some embodiments, a connector-to-gap ratio is between 0.25:1 and 2:1, between 0.5:1 and 2:1, or between 1:1 and 2:1. Additionally, in some embodiments, a connector-to-gap ratio is between 0.25:1 and 1:1, between 0.25:1 and 0.5:1, or between 0.5:1 and 1:1.

Additionally, as previously discussed, a shape of the connectors can be modified as desired in order to minimize tensile force necessary to separate the sidewalk from the 3D printed object and/or to minimize curl of the corner or curve. In some embodiments, some or all of the connectors have sides that define an angle of 90 degrees or less relative to the perimeter of the 3D printed object adjacent the respective connector. An example of connectors having an angle of approximately 90 degrees is provided in FIGS. 6A and 6B. FIG. 12 illustrates another embodiment consistent with the present disclosure. FIG. 12 provides an illustration of the various parameters that may be modified in order to alter connector shape. In FIG. 12, connectors and gaps are defined by Connector Length ($L_C$), Outer Gap Length ($L_{GO}$), Sidewalk Length ($L_S$) and Inner Gap Length ($L_{Gi}$). Any one or more of these parameters may be altered in order to modify connector shape. Increasing the Inner Gap Length without altering Outer Gap Length can provide increased ease of sidewalk removal. Decreasing Inner Gap Length without altering Outer Gap Length can provide reduced edge curling or warping on the 3D printed object.

Figure 4:
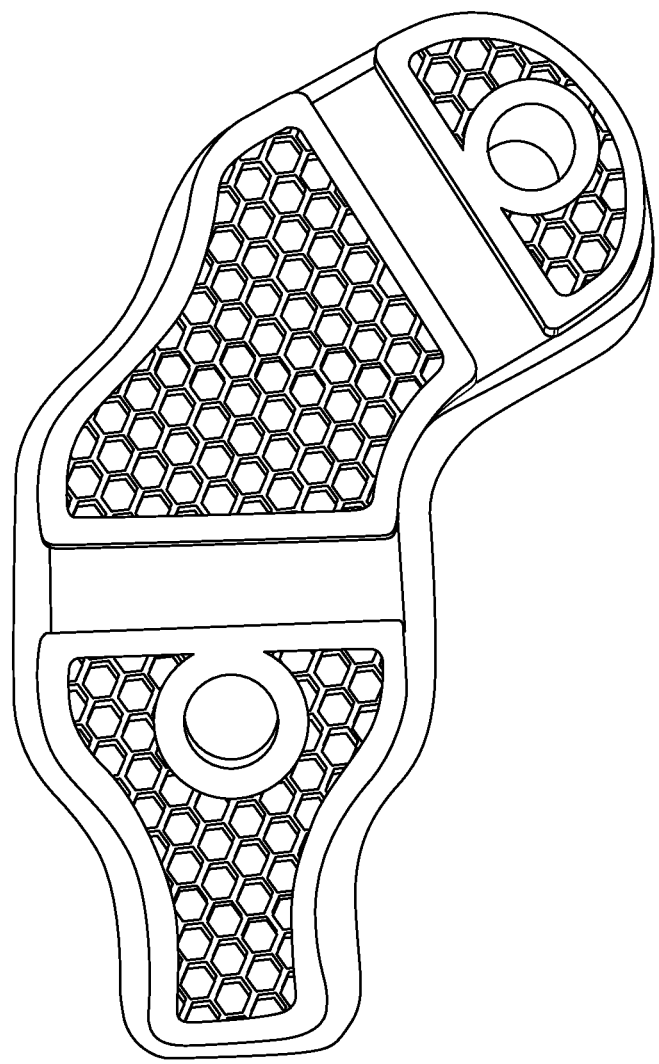
FIG. 4 illustrates a prior art 3D printed object using a previously-existing technique for minimizing corner curl.

In a further embodiment of methods described herein, a border of the sidewalk intermittently contacts the perimeter of the 3D printed object to form or define the perforated interface. In such embodiments, a border of the sidewalk is formed in a wavy or curved manner in order to reduce contact of the sidewalk to the perimeter of the 3D printed part relative to the prior art technique illustrated in FIG. 4, in which the skirt is in continuous contact with the 3D printed object. Thus, in embodiments in which the sidewalk border intermittently contacts the perimeter of the 3D printed object, the perforated interface can be printed concurrently with the sidewalk of the skirt.

Figure 13:
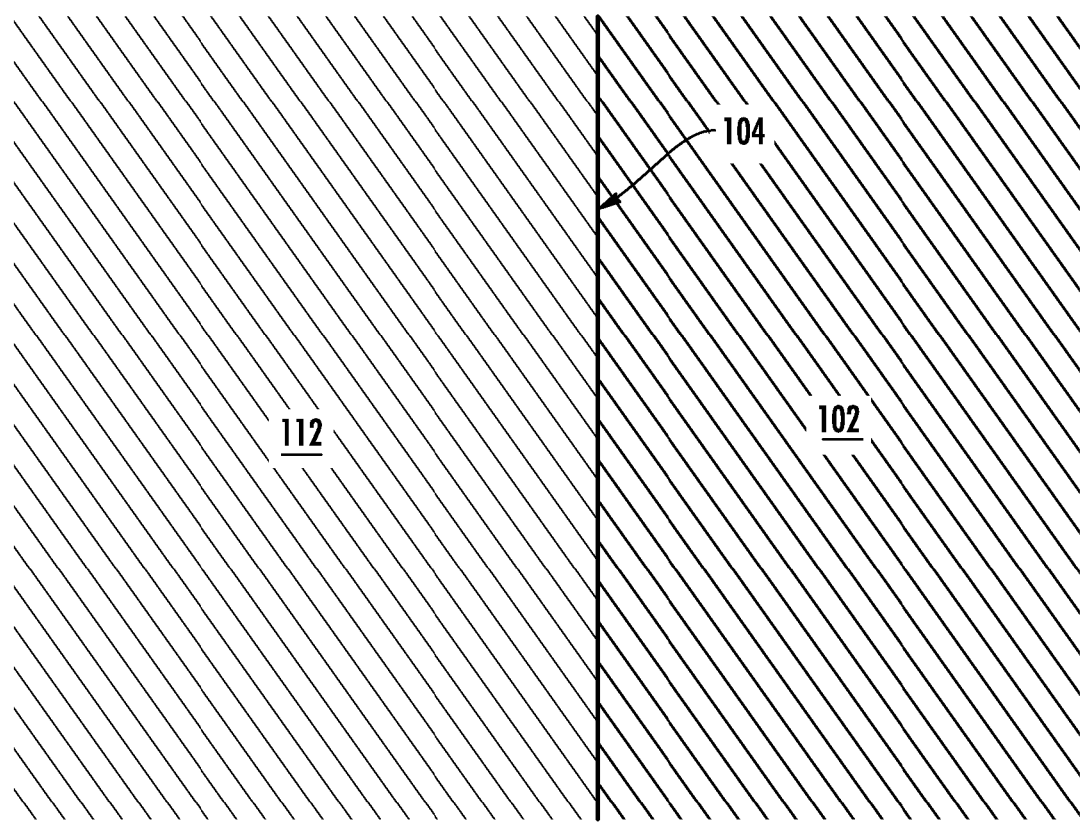
FIG. 13 illustrates a schematic representation of a portion of at least a first layer of a 3D printed object and at least a first layer of a skirt that may be made according to one embodiment of a method described herein.
Figure 14A:
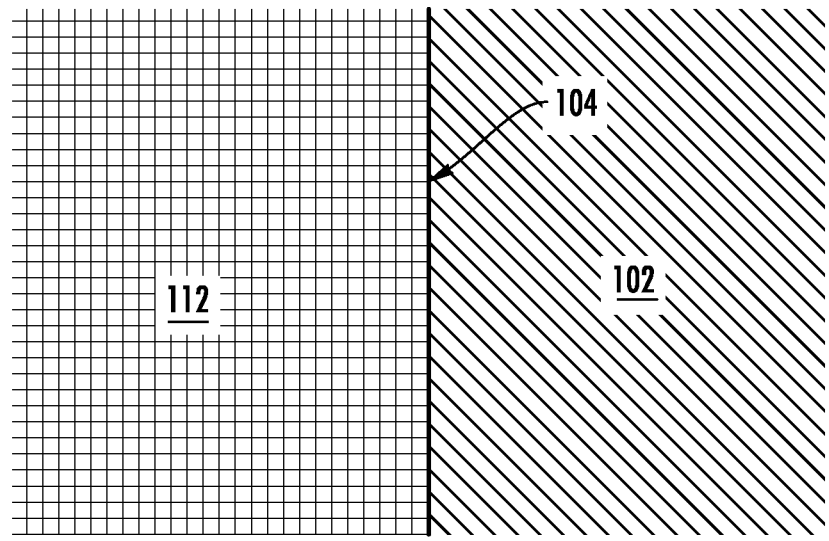
FIG. 14A illustrates a schematic representation of a portion of at least a first layer of a 3D printed object and at least a first layer of a skirt that may be made according to one embodiment of a method described herein.
Figure 14B:
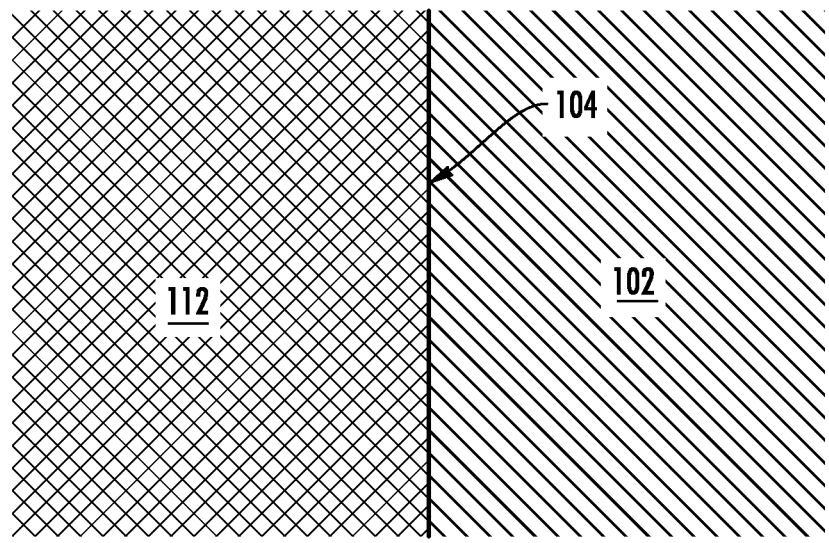
FIG. 14B illustrates a schematic representation of a portion of at least a first layer of a 3D printed object and at least a first layer of a skirt that may be made according to one embodiment of a method described herein.
Figure 14C:
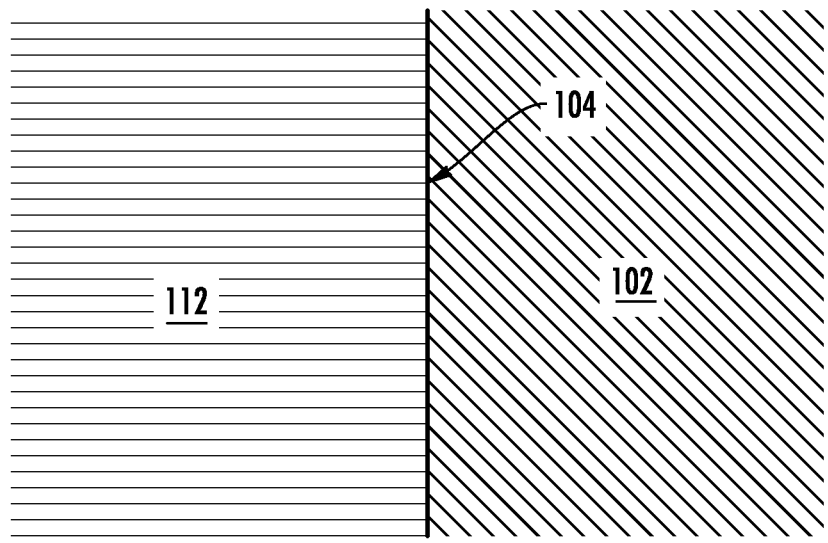
FIG. 14C illustrates a schematic representation of a portion of at least a first layer of a 3D printed object and at least a first layer of a skirt that may be made according to one embodiment of a method described herein.
Figure 14D:
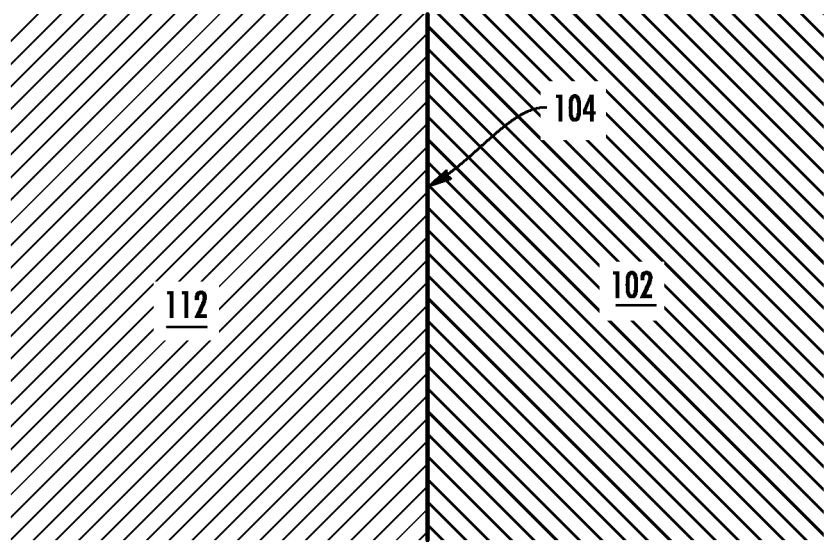
FIG. 14D illustrates a schematic representation of a portion of at least a first layer of a 3D printed object and at least a first layer of a skirt that may be made according to one embodiment of a method described herein.
Figure 14E:
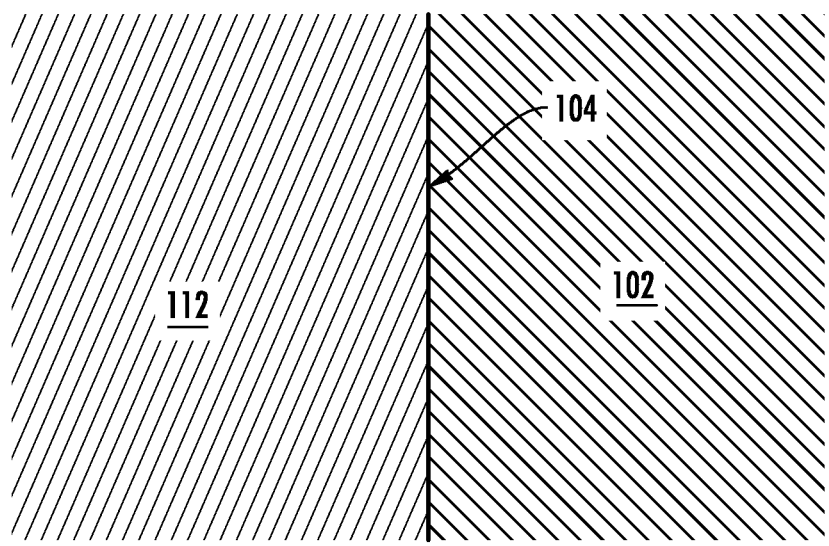
FIG. 14E illustrates a schematic representation of a portion of at least a first layer of a 3D printed object and at least a first layer of a skirt that may be made according to one embodiment of a method described herein.

In yet further embodiments of methods described herein, a perforated interface is at least partially defined or formed by fill patterns of the 3D printed object and the skirt. In some such embodiments, the sidewalk is printed with no border, allowing the sidewalk fill pattern to abut or adjoin a fill pattern of the 3D printed object. Additionally or alternatively, certain contrasting or differently-oriented fill patterns can form a perforated interface. For example, depositing a fill pattern of the sidewalk at a 45 degree angle relative to the 3D printed object border creates or defines a perforated interface. Such an embodiment is illustrated in FIG. 13. As illustrated in FIG. 13, the fill pattern of the sidewalk (112) is disposed at 45 degrees relative to the 3D printed object border (104). However, other fill-pattern configurations are also possible in order to create or define a perforated interface. For example, FIGS. 14A-14E illustrate a variety of fill pattern arrangements which may be appropriate for such purpose. FIG. 14A illustrates a perpendicular hatch pattern. FIG. 14B illustrates a diagonal hatch pattern. FIG. 14C illustrates a perpendicular line pattern. FIG. 14D illustrates an obtuse angle pattern. FIG. 14E illustrates an acute angle pattern.

Figure 16:
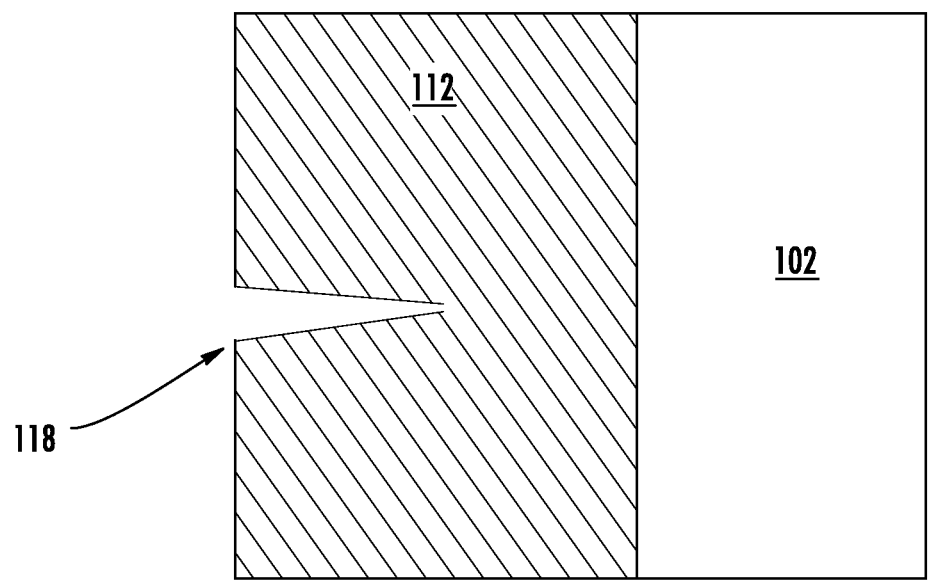
FIG. 16 illustrates a schematic representation of a portion of at least a first layer of a 3D printed object and at least a first layer of a skirt that may be made according to one embodiment of a method described herein.

Methods described herein can further comprise or include additional method steps or processes. For example, in some embodiments, methods described herein further comprise pulling apart the 3D printed object and the skirt. In order to facilitate pulling apart the sidewalk and the skirt, methods described herein can comprise or include forming a tear-off starter. A "tear-off starter," for reference purposes herein, is a gap, slit, or slot in the sidewalk that permits an operator to more easily start or begin tearing the sidewalk away from the 3D printed object. FIG. 16 illustrates one embodiment of a tear-off starter consistent with the present disclosure. A tear-off starter is, in some embodiments, formed concurrently with or as a step of the deposition of build material to form the sidewalk. Some embodiments of methods described herein comprise pulling apart the sidewalk and the 3D printed object by applying a force to the tear-off starter.

Figure 15:
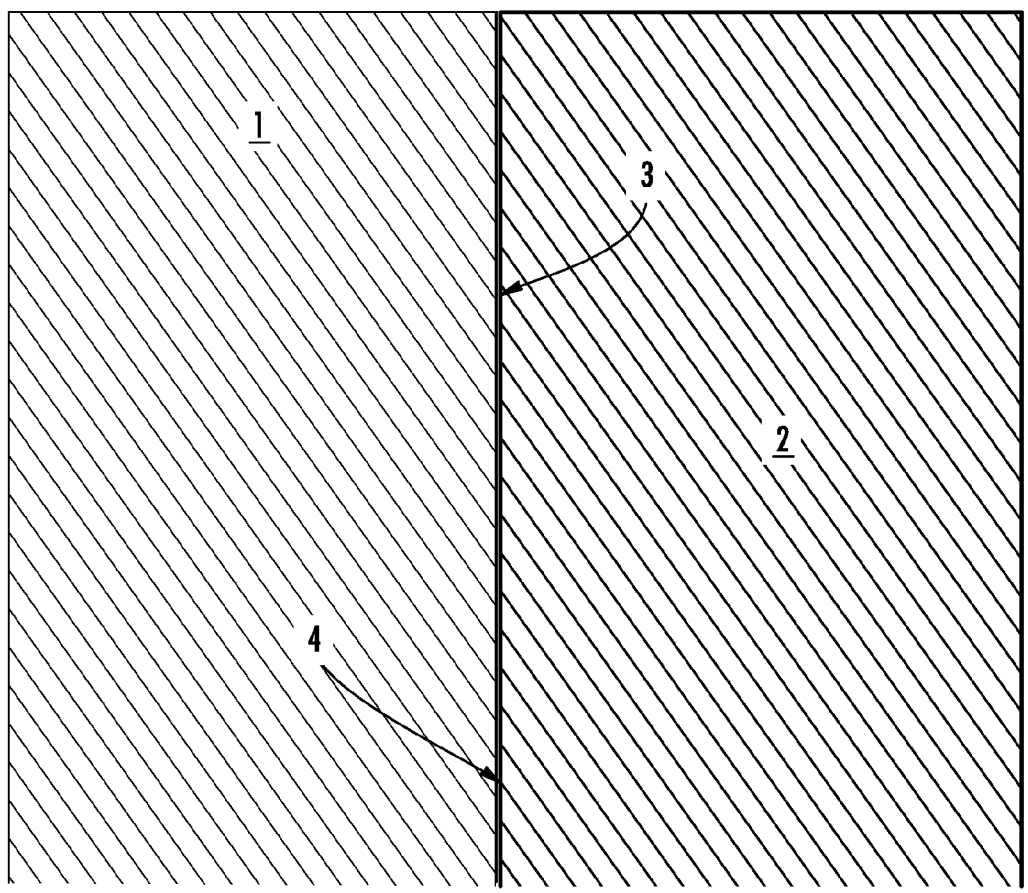
FIG. 15 illustrates a schematic representation of a portion of at least a first layer of a 3D printed object and at least a first layer of a skirt that may be made according to one embodiment of a method described herein.

In addition to the above method steps, structures, and print sequencing, it is to be understood that build material deposition may be sequenced in a manner designed to improve adhesion of one or more components to the print plate. In some embodiments of methods described herein, it may be desired to use an adhesive to adhere the build material to the print plate. In such embodiments, the first few moments of printing the first layer can affect the 3D printed object and/or the sidewalk's adhesion to the print plate due to the time required for material deposition and for the adhesive to dry. In some embodiments, therefore, the first material deposited will be applied to semi-wet glue, achieving optimal or improved adhesion to the print plate. In conventional methods of 3D printing, the borders are drawn first, followed by the fill patterns. However, the fill patterns hold the 3D printed object and the sidewalk to the print plate, providing strength. The border is primarily designed to maintain shape of the part and/or the sidewalk without addition of strength. Thus, in order to maximize the use of the strength of the first layer, some embodiments of methods described herein comprise deposition of the fill material first, following with application of the borders. Such sequencing promotes reduction in warp by allowing the best adhesion of the first layer to the print plate. FIG. 15 indicates the sequencing described above. First, the sidewalk fill is deposited. Second (subsequent to the first step), the part/3D printed object fill is deposited. Third (subsequent to the second step), the part/3D printed object border is deposited. Fourth (subsequent to the third step), the sidewalk border is deposited.

Figure 11:
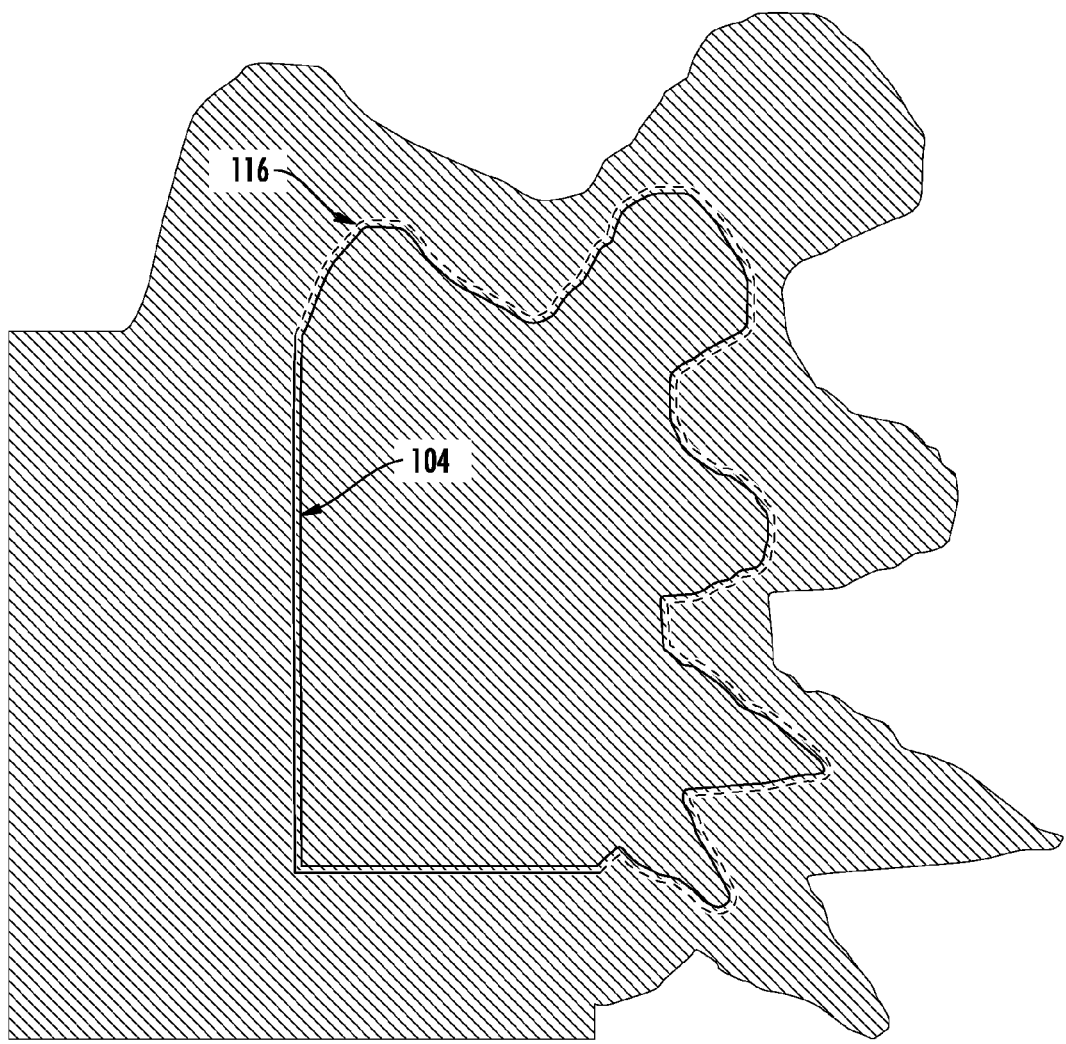
FIG. 11 illustrates a schematic representation of at least a first layer of a 3D printed object and at least a first layer of a skirt that may be made according to one embodiment of a method described herein.

In a further aspect of the present invention, an operator, with or without the assistance of a software application, can determine the necessity of a perforated interface based upon the number of corners/curves and/or the length of a linear portion of a perimeter of the 3D printed object. For example, FIG. 11 illustrates an embodiment of a cross-sectional profile in which a perforated interface may not be applied universally around the entire perimeter of the 3D printed object. Where a portion of sufficient length is linear or substantially linear, the operator (or software application) may cause build material to be deposited in a manner such that a perforated interface is only applied along curved areas. Upon completion of a build, the operator can bend/snap the linear portions, a task that is much more difficult for curved portions.

Figure 10:
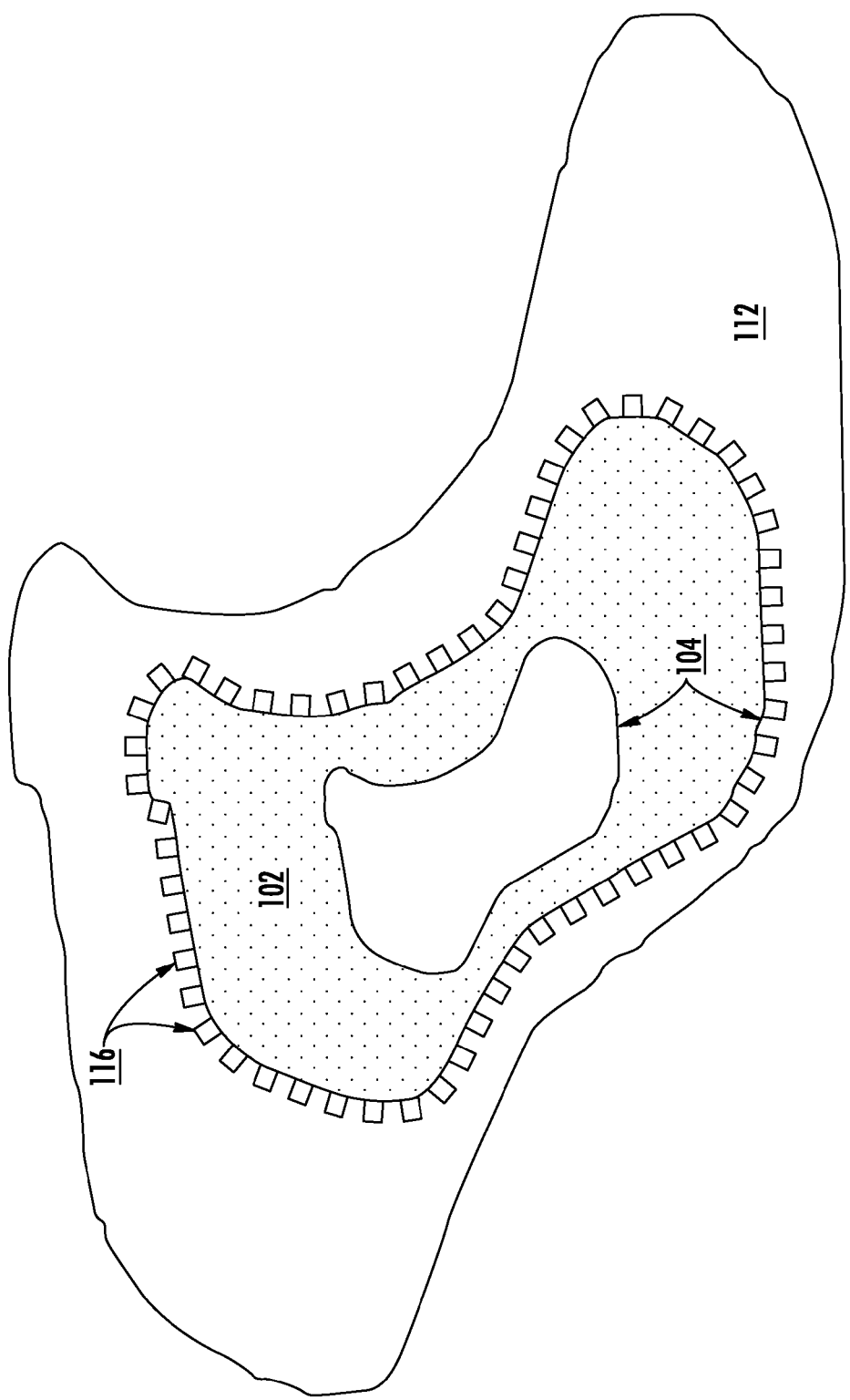
FIG. 10 illustrates a schematic representation of at least a first layer of a 3D printed object and at least a first layer of a skirt that may be made according to one embodiment of a method described herein.

Additionally, in some embodiments, a skirt can be applied only along an outer perimeter of the 3D printed device. Such techniques may be required or desired where a 3D printed device exhibits a geometry defining interior holes or recesses. An illustration of this method step is illustrated in FIG. 10. In FIG. 10, the sidewalk follows only the outermost contour of the shape, thereby eliminating warp, but without interfering with detailed inner geometry for small holes, gaps, or recesses.

Figure 8A:
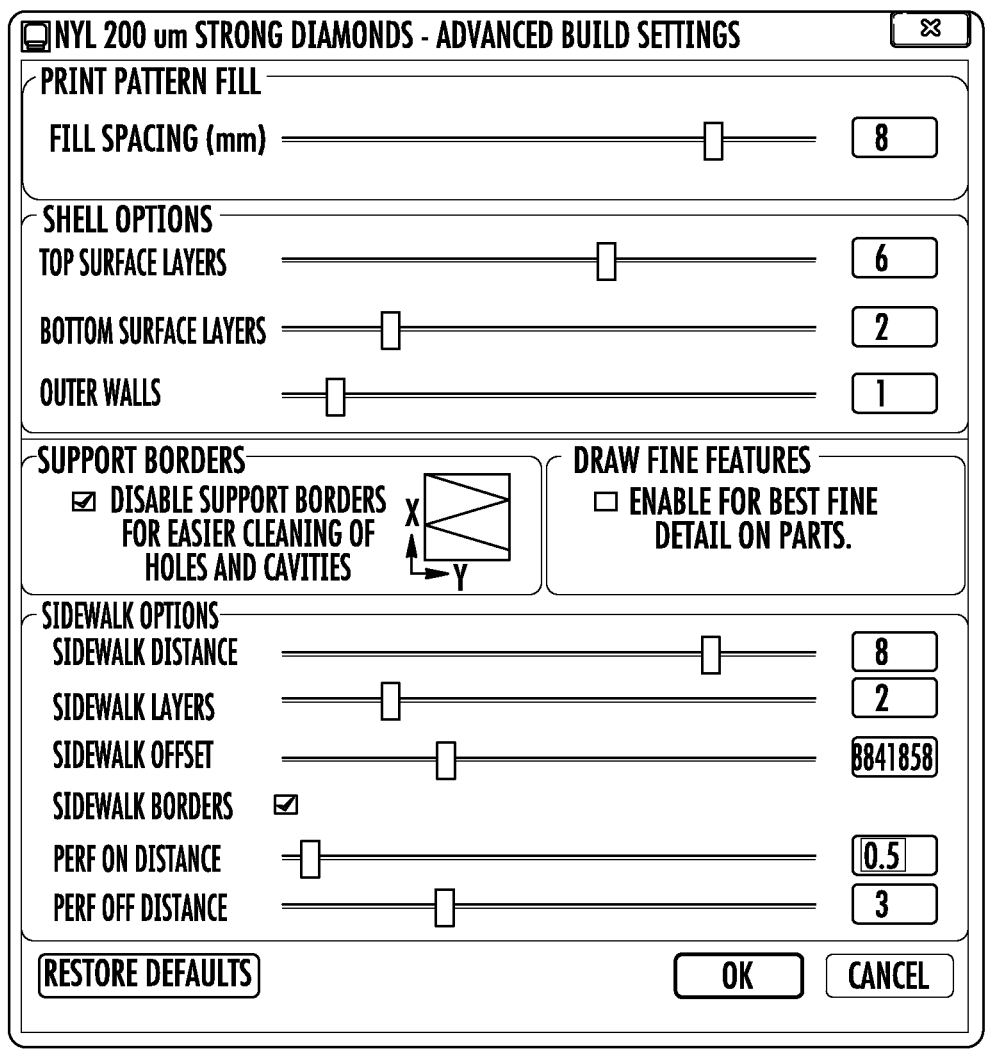
FIG. 8A illustrates an example graphic user interface (GUI) which may be used to modify one or more parameters of a 3D printing device to make a 3D printed object and skirt according to a method described herein.
Figure 8B:
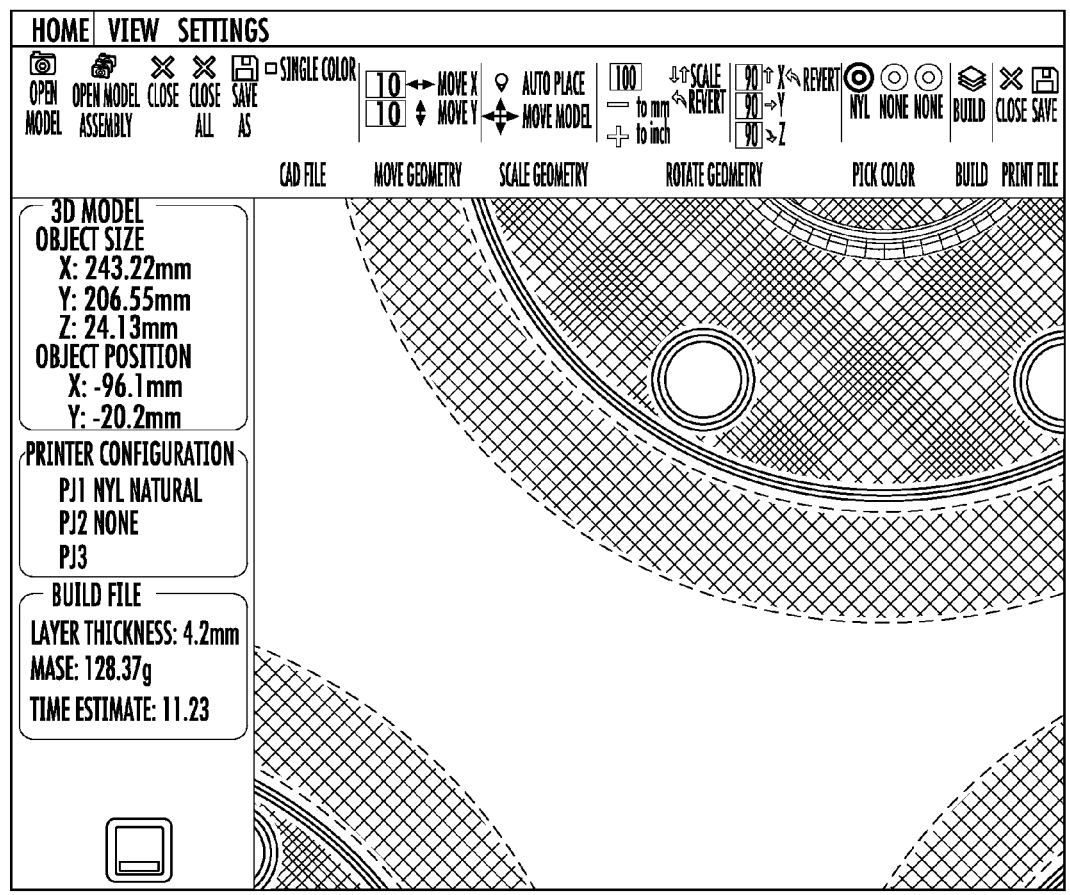
FIG. 8B illustrates an example graphic output of a user-designed 3D printed object and skirt that may be made according to one embodiment of a method described herein.
Figure 9A:
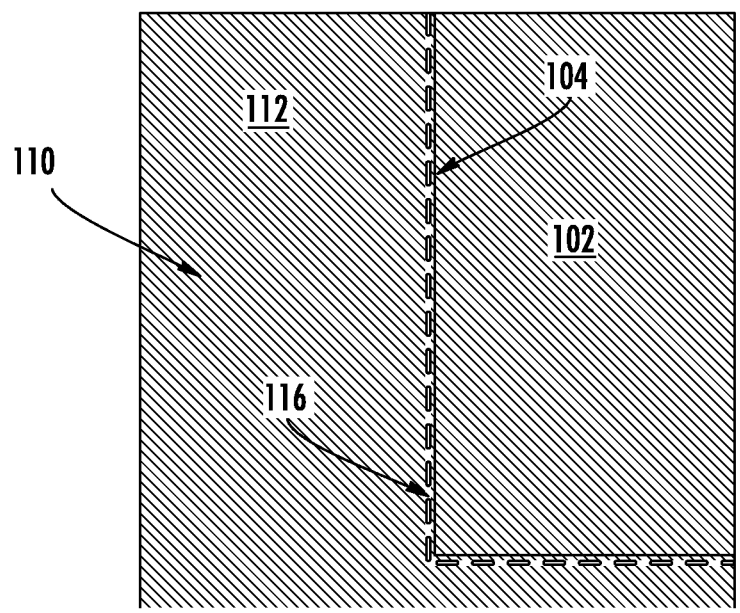
FIG. 9A illustrates a schematic representation of a portion of a 3D printed object, sidewalk, and perforated interface that may be made according to one embodiment of a method described herein.
Figure 9B:
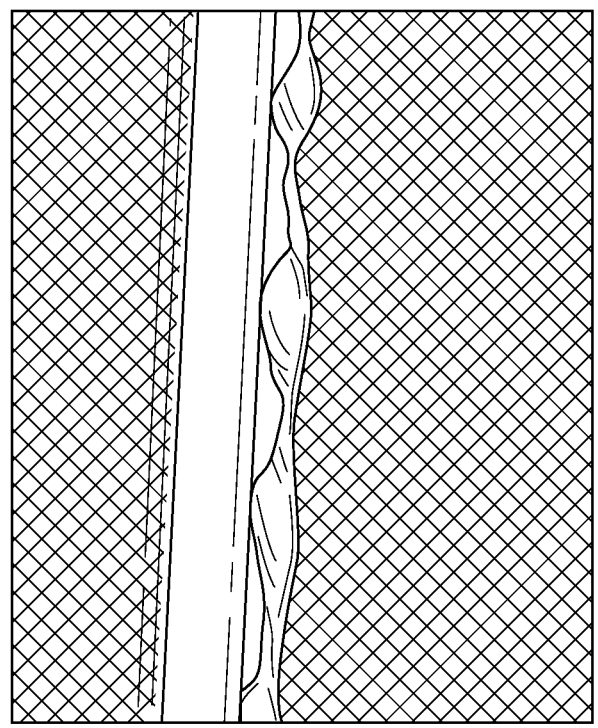
FIG. 9B illustrates a portion of a 3D printed object, sidewalk, and perforated interface that made according to one embodiment of a method described herein.

As discussed herein above, a software application may be used to assist an operator in determining optimum or desired placement, location, and configuration of a skirt and/or perforated interface. In some embodiments, a software application assesses a design file to determine the desired parameters. In certain other embodiments, a graphic user interface (GUI) is provided that permits a user to modify or adjust one or more parameters as desired or as required. FIG. 8A illustrates one such GUI permitting modification of advanced settings including sidewalk parameters. FIG. 8B illustrates an output provided by the software application to illustrate a schematic representation of the resulting structure from the design input using the GUI. FIG. 9A illustrates how a schematic representation may appear with such a design tool, and FIG. 9B shows an enlarged sectional view of the resulting perforated interface.

EXAMPLE 1

Methods of 3D Printing an Object with Reduced Curl

A variety of 3D printed objects along with corresponding skirts (comprising a sidewalk and a perforated interface) were produced consistent with methods described herein. The resulting 3D printed objects and skirts were then tested to determine the tensile strength of various configurations of perforated interfaces. 3D printed objects were produced having varied connector-to-gap or contact-to-gap ratios. The ratios used are described further herein below. FIGS. 7A-7E illustrate tensile strength testing equipment, protocol, and data.

Figure 7A:
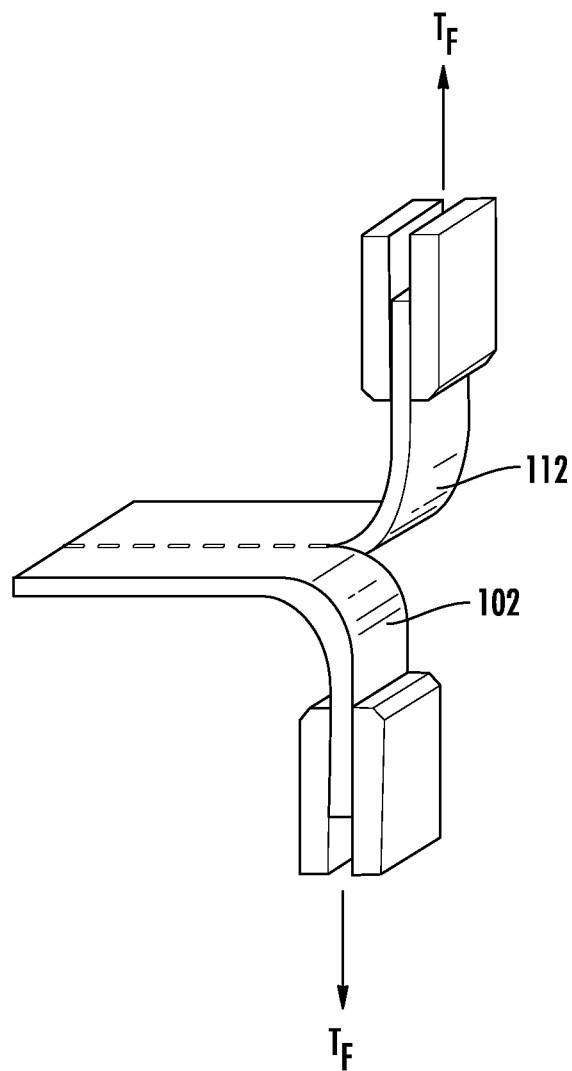
FIG. 7A illustrates a schematic representation of an experimental setup used to test tensile strength of a 3D printed object and skirt made according to one embodiment of a method described herein.
Figure 7B:
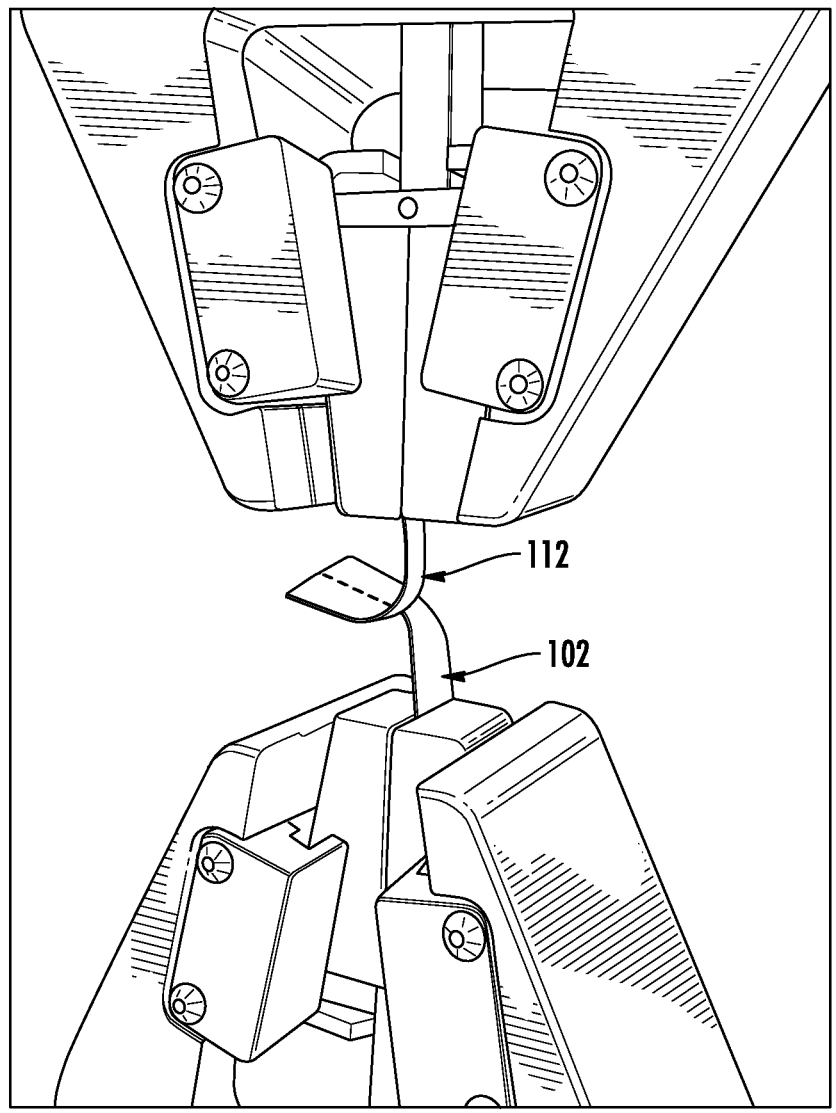
FIG. 7B illustrates an experimental setup used to test tensile strength of a 3D printed object and skirt made according to one embodiment of a method described herein.

Specifically, FIG. 7A illustrates in schematic form the tensile forces ($T_F$) applied to the 3D printed object (102) and the sidewalk (112). An upward force was applied to the sidewalk (112), and a downward force was applied to the 3D printed object (102), and the total force required to propagate a tear along the perforation was measured. FIG. 7B illustrates the actual test fixture for the Type-T (Trouser Tear Test). In the experimental setup, four different perforation configurations were tested:
1. $P_{ON}$=0.5 mm; $P_{OFF}$=3.0 mm.
2. $P_{ON}$=1.0 mm; $P_{OFF}$=3.0 mm.
3. $P_{ON}$=2.0 mm; $P_{OFF}$=1.0 mm.
4. Full border connection, no perforation.

Figure 7C:
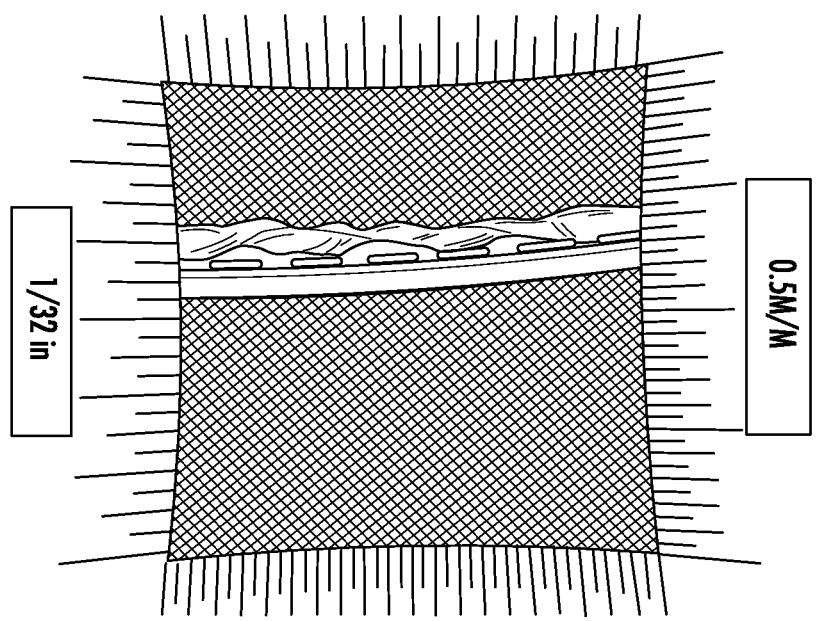
FIG. 7C illustrates a magnified view of a portion of a 3D printed object and skirt at the object-sidewalk interface made according to one embodiment of a method described herein.
Figure 7D:
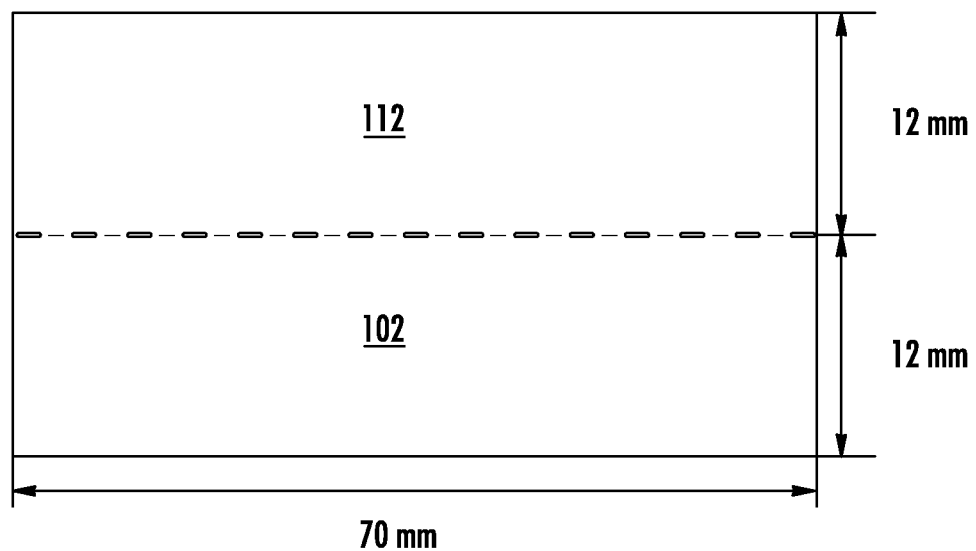
FIG. 7D illustrates a schematic view of an object-sidewalk interface that may be made according to one embodiment of a method described herein.
Figure 7E:
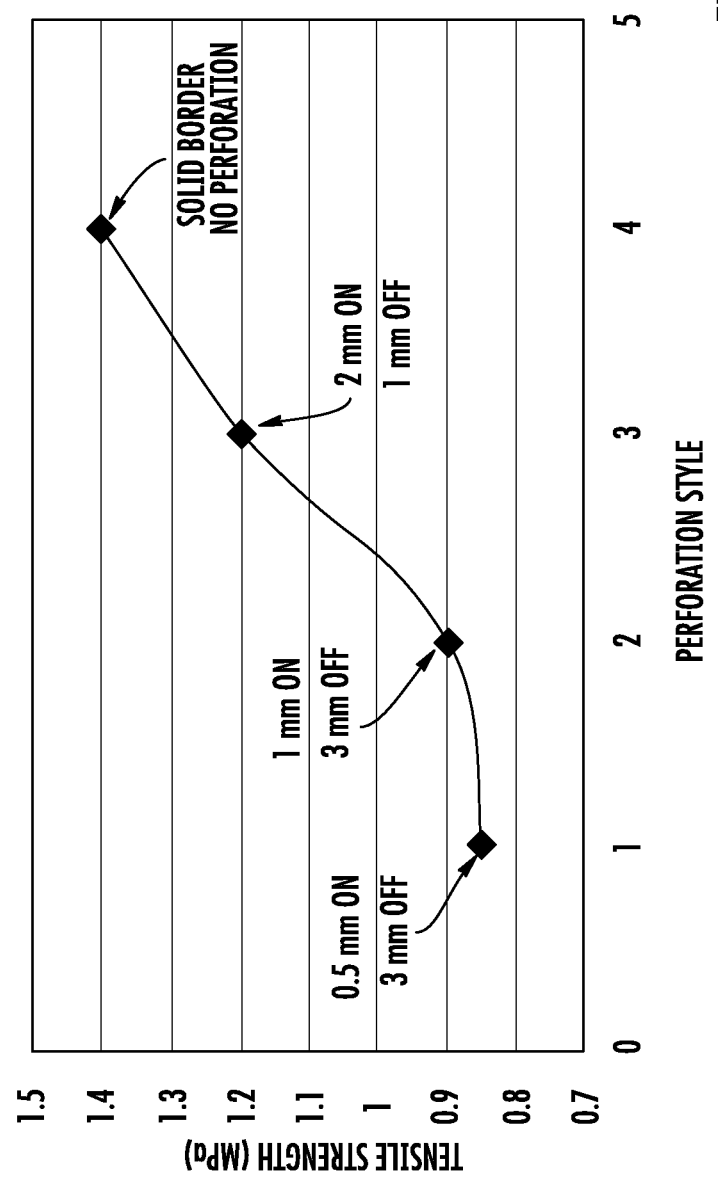
FIG. 7E illustrates experimental data output for 3D printed objects and skirts made according to one embodiment a method described herein.

Perforation style 1 defined a connector-to-gap or contact-to-gap ratio of 0.167:1. Perforation style 2 defined a connector-to-gap or contact-to-gap ratio of 0.33:1. Perforation style 3 defined a connector-to-gap or contact-to-gap ratio of 2:1. Samples used in the experimental setup were made of Nylon and were printed with the dimensions illustrated in FIG. 7D—sidewalk width of 12 mm; 3D printed object width of 12 mm; sidewalk/object length of 70 mm. FIG. 7C illustrates an enlarged view of the perforated interface of one experimental configuration. FIG. 7E illustrates the data obtained from the Type-T test.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of three-dimensional objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A method of 3D printing an object, the method comprising:
   depositing build material in a predetermined pattern to form a first layer of a 3D printed object; and
   depositing build material in a predetermined pattern to form a first layer of a skirt in contact with the 3D printed object,
   wherein depositing build material to form the first layer of the skirt comprises 3D printing a first layer of a sidewalk that substantially surrounds at least a portion of a perimeter of the 3D printed object and 3D printing a first layer of a perforated interface between the sidewalk and the perimeter of the skirt, and
   wherein depositing build material in a predetermined pattern to form the first layer of the 3D printed object is carried out prior to depositing build material in a predetermined pattern to form the first layer of the skirt.

2. The method of claim 1 further comprising depositing build material in a predetermined pattern to form a number of additional layers of the skirt beyond the first layer,
   wherein the 3D printed object defines a geometry; and
   wherein the number of additional layers of the skirt deposited is determined by at least one of the geometry and build material of the 3D printed object.

3. The method of claim 1, wherein:
   the 3D printed object defines a geometry; and
   a width of the sidewalk is determined based upon at least one of the geometry and build material of the 3D printed object.

4. The method of claim 1, wherein depositing build material in a predetermined pattern to form the first layer of the skirt comprises:
   first, depositing build material to form a perimeter of the sidewalk of the skirt; and
   second, depositing build material to form a plurality of contacts to define the perforated interface between the sidewalk and the perimeter of the 3D printed object.

5. A method of 3D printing an object, the method comprising:
   depositing build material in a predetermined pattern to form a first layer of a 3D printed object; and
   depositing build material in a predetermined pattern to form a first layer of a skirt in contact with the 3D printed object,
   wherein depositing build material to form the first layer of the skirt comprises 3D printing a first layer of a sidewalk that substantially surrounds at least a portion of a perimeter of the 3D printed object and 3D printing a first layer of a perforated interface between the sidewalk and the perimeter of the skirt, and
   wherein depositing build material in a predetermined pattern to form the first layer of the skirt comprises:
   depositing build material to form the sidewalk of the skirt; and
   concurrent with depositing build material to form the sidewalk, depositing build material to form a plurality of connectors and a plurality of gaps along the perimeter of the 3D printed object.

6. The method of claim 5, wherein a connector-to-gap ratio is less than or equal to 2:1.

7. The method of claim 6, wherein the connector-to-gap ratio is less than or equal to 1:1.

8. The method of claim 6, wherein the connector-to-gap ratio is less than or equal to 0.5:1.

9. The method of claim 6, wherein the connector-to-gap ratio is less than or equal to 0.25:1.

10. The method of claim 5, wherein:
    at least two of the connectors have sides that define an angle of 90 degrees or less relative to the perimeter of the 3D printed object adjacent the respective connector.

11. The method of claim 1, wherein:
    the sidewalk comprises a sidewalk border; and
    the sidewalk border intermittently contacts the perimeter of the 3D printed object to define the perforated interface.

12. The method of claim 1, wherein 3D printing the first layer of the sidewalk comprises defining a tear-off starter in the first layer of the sidewalk.

13. The method of claim 1 further comprising separating the sidewalk from the 3D printed object by pulling the sidewalk away from the 3D printed object in a direction that causes the perforated interface to separate from the 3D printed object.

14. The method of claim 13, wherein:
    3D printing the first layer of the sidewalk comprises defining a tear-off starter in the first layer of the sidewalk; and
    separating the sidewalk from the 3D printed object by pulling the sidewalk away from the 3D printed object comprises applying a force to the tear-off starter.

15. The method of claim 1, wherein:
depositing build material to form the first layer of the sidewalk defines a fill pattern; and
the fill pattern contacts the perimeter of the 3D printed object to define the perforated interface.

16. The method of claim 15, wherein the fill pattern defines at least one of a perpendicular hatch pattern, a diagonal hatch pattern, a perpendicular line pattern, an obtuse angle pattern, and an acute angle pattern.

17. The method of claim 15, wherein:
the fill pattern defined by depositing build material to form the first layer of the sidewalk is a first fill pattern;
depositing build material to form the first layer of the 3D printed object defines a second fill pattern; and
the first fill pattern differs from the second fill pattern.

18. A method of 3D printing an object, the method comprising:
first, depositing build material to define at least a first layer of a fill portion of a 3D printed object;
second, depositing build material to define at least a first layer of a fill portion of a sidewalk substantially surrounding at least a portion of the 3D printed object;
third, depositing at least a first layer of a border portion of the 3D printed object; and
fourth, depositing at least a first layer of a border portion of the sidewalk,
wherein a perforated interface is defined between the sidewalk and the border of the 3D printed object.

* * * * *